(12) United States Patent
Stone

(10) Patent No.: US 10,524,453 B2
(45) Date of Patent: Jan. 7, 2020

(54) TREAT DISPENSING PET TOY

(71) Applicant: The KONG Company LLC, Golden, CO (US)

(72) Inventor: John James Stone, Golden, CO (US)

(73) Assignee: THE KONG COMPANY, LLC., Golden, CO (US)

(*) Notice: Subject to any disclaimer, the term of this patent is extended or adjusted under 35 U.S.C. 154(b) by 125 days.

(21) Appl. No.: 15/906,412

(22) Filed: Feb. 27, 2018

(65) Prior Publication Data

US 2019/0261601 A1  Aug. 29, 2019

(51) Int. Cl.
*A01K 15/02* (2006.01)
*A01K 5/02* (2006.01)

(52) U.S. Cl.
CPC .............. *A01K 15/025* (2013.01); *A01K 5/02* (2013.01)

(58) Field of Classification Search
CPC ... A01K 15/025; A01K 5/0114; A01K 15/026
USPC ........... 119/707, 710, 51.01, 51.03, 702, 709
See application file for complete search history.

(56) References Cited

U.S. PATENT DOCUMENTS

| | | | |
|---|---|---|---|
| 6,073,581 A | 6/2000 | Wang | |
| 6,098,571 A * | 8/2000 | Axelrod | A01K 15/025 119/707 |
| 6,158,391 A * | 12/2000 | Simonetti | A01K 5/0114 119/702 |
| 7,600,488 B2 | 10/2009 | Mann | |
| 7,631,613 B2 * | 12/2009 | Lescroart | A01K 15/025 119/51.01 |
| 8,640,647 B2 * | 2/2014 | Dotterer | A01K 15/025 119/51.01 |
| 8,807,088 B2 * | 8/2014 | Axelrod | A01K 15/026 119/51.03 |
| 8,904,967 B2 | 12/2014 | Reiss et al. | |
| D825,116 S * | 8/2018 | Wills | D30/160 |
| 2008/0083378 A1* | 4/2008 | Pearce | A01K 5/0114 119/707 |
| 2012/0012068 A1* | 1/2012 | Costello | A01K 15/025 119/707 |
| 2012/0318210 A1* | 12/2012 | Anderson | A01K 5/0114 119/710 |
| 2017/0105390 A1* | 4/2017 | Wilson | A01K 15/027 |

* cited by examiner

*Primary Examiner* — Yvonne R Abbott-Lewis
(74) *Attorney, Agent, or Firm* — Berg Hill Greenleaf Ruscitti, LLP.

(57) ABSTRACT

A treat dispensing pet toy comprises a hub assembly having first and second hubs and an axle interconnecting the hubs. A barrel is mounted over the axle and is disposed between the hubs. The barrel has an interior chamber to hold treats. A treat dispensing opening is formed on the barrel and communicates with the interior chamber. When the pet toy is contacted with sufficient force, the hub assembly and barrel independently rotate thereby establishing a rotational differential. Treats fall through or are otherwise ejected from the opening in the barrel. According to a method of dispensing treats, the barrel and hub assembly independently rotate at different rotational speeds to affect the rate of dispensing treats.

17 Claims, 5 Drawing Sheets

TREAT DISPENSING PET TOY

FIELD OF THE INVENTION

The invention relates to a device and method for dispensing treats for consumption by an animal, and more particularly, to a treat dispensing pet toy in which treats are dispensed by differential movement between complementary elements of the pet toy resulting in variable dispensing rates.

BACKGROUND OF THE INVENTION

There are a wide range of pet toys available today with many distinct functional features. Pet toys can be made from many different types of materials along with a nearly limitless number of shapes and colors. Toys are now designed for different types and sizes of animals as well as to target desired levels of interaction and activity.

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker", is also known to be placed inside the toy to further stimulate the animal.

Another general category of pet toys is "plush" toys. These types of toys are made from different types of cloth or fabric, and may also include material woven into strands, such as nylon rope. The plush toy is typically stuffed with a fibrous material, such as polyester stuffing, to provide the toy with an increased thickness or bulk that enables the animal to chew on the toy. Plush toys may also include squeakers to further stimulate the animal.

Yet another general category of pet toy is one that is especially adapted for dispensing treats when an animal interacts with the pet toy. This category typically has a receptacle to hold treats and one or more openings that enable the treats to be dispensed by movement of the toy.

One example of a treat dispensing pet toy includes the invention disclosed in the U.S. Pat. No. 8,904,967. The treat dispenser dispenses treats by moving the dispenser in a way to gravity release treats from the interior hollow chamber of the toy. The dispenser includes a central spherical body, and a plurality of peripherally spaced spheres or balls connected to the body by respective branches. Each of the balls has a treat dispensing opening. The body has an opening for charging or loading treats. As an animal plays with the device, treats are dispensed through the openings. The openings are located at different positions on each of the balls so that treats are likely to be dispensed when the device is placed at various orientations.

Another example of a treat dispensing toy is disclosed in the U.S. Pat. No. 6,073,581. A ball-like toy includes a spherical shell and a cylindrical valve, the spherical shell being formed of two symmetrical half shells. The half shells have ribs and partition boards, the cylindrical valve being mounted in a hole on the spherical shell and retained between the ribs and partition boards of the half shells. When the toy is rotated within a limited angle, dog food is discharged out of the spherical shell through the cylindrical valve when the spherical shell is rolled on the ground.

Yet another example of a treat dispensing toy is disclosed in the U.S. Pat. No. 7,600,488. This reference provides a pet with a body having a first treat-retaining cavity and a first opening that extends between the first treat-retaining cavity and an outer surface of the body. A metering device in the first opening dispenses treats from the first treat-retaining cavity through the first opening at a metered rate. The first treat-retaining cavity is refillable through the metering device.

Despite the number of different treat dispensing pet toys, there is still a need to provide a pet toy that can better stimulate an animal to achieve extended play and interaction with the toy. There is also a need to provide a pet toy that is robust enough to withstand contact by the animal and owner, but is relatively simple in construction and therefore can be produced at a reasonable cost. There is also a need to provide a pet toy dispenser that may dispense treats at different rates and the rate of dispense is not necessarily predictable based on movement of the toy at similar speeds or rotations.

The invention described below provides solutions to many limitations in the prior art. The pet toy device has a construction that is relatively simple in structure yet allows for dispensing treats in unpredictable ways to better stimulate an animal. The rate of treat dispensing as described can be defined by the differential movement or rotation between complementary elements of the toy.

SUMMARY OF THE INVENTION

According to a preferred embodiment of a device of the invention, it includes a treat dispensing toy with two primary interoperable elements or components; namely, a cylinder or barrel, and a hub assembly engaged with the barrel. The hub assembly has two hubs that are interconnected by an axle. The axle extends through an interior sleeve of the barrel. The sleeve is disposed within an interior chamber defined by a barrel wall of the barrel. The hubs have a first larger diameter as compared to a second smaller diameter of the barrel. When the toy is placed on the ground, the hubs enable the toy to roll along the peripheral edges of the hubs or to slide along the edges depending upon the surface upon which the toy is placed, the weight of the toy, and the force imparted upon the toy. The barrel has a first closed end with the sleeve attached thereto. The second opposite end of the barrel may be open, or may have a corresponding closed end with an opening to receive the axle. The barrel is capable of independently rotating about the axle if a sufficient force is applied to the barrel.

The exposed ends of the hubs may be covered with decorative end caps. The end caps may have irregular surface features for better gripping or holding by an animal during play. Similarly, the exterior surface of the barrel may also have irregular surface features. The end caps may optionally have peripheral edges that extend outward from the peripheral edges of the hubs thereby increasing an effective diameter of the toy for rolling along a surface.

Treats may be loaded in the chamber of the barrel through a removable barrel cover that is selectively opened to load treats. Alternatively, one end of the toy can be unscrewed and removed. The axle has two parts interconnected by a threaded connection. Unscrewing the axle allows one hub and end cap to be removed thus exposing the interior chamber of the barrel for loading treats.

The barrel cover has one or more treat dispensing openings for dispensing the treats. Alternatively, the barrel wall may have one or more treat dispensing openings. The interior edge of the barrel cover surrounding the treat dispensing opening may have a plurality of inwardly extending projections. These projections increase the difficulty of an animal's paw becoming wedged in the dispensing opening.

In use of the toy, treats are loaded within the chamber with a desired amount and type(s) of treats. The pet toy is placed on the ground or on another surface for access by an animal. The toy is capable of rotating or sliding along the peripheral edges of the hubs or end caps when contacted by the animal. The barrel is capable of independent rotation if an adequate force is centered on the barrel. During play with an animal, the hubs and barrel are likely to rotate simultaneously but at different rates. In one example, because of the weight of the treats within the barrel, the barrel will rotate at a slower speed from the hubs. The difference between rotational speeds is defined as a rotation differential between the hubs and barrel. The rotation differential causes some unpredictability in the rate of dispensing treats. The weight and size of the loaded treats will affect the rotational ability of the barrel, along with an amount of force that is applied directly to the barrel. In another example, an animal may contact the barrel without contacting the hubs causing the barrel to rotate at a higher rate, and in some cases, higher than the hubs. In this latter case, the rate of dispense of the treats may be higher although the hubs may not rotate or rotate at a substantially slower speed.

Another factor affecting the rotation differential is the amount of frictional engagement between the outer surface of the axle and the interior surface of the sleeve through which the axle is mounted. A lower magnitude of frictional engagement between the axle and the sleeve allows the barrel to have a relatively higher rotational speed while a higher magnitude of frictional engagement causes the barrel to have a relatively lower rotational speed.

Considering the various features and attributes of the invention, in one aspect, the invention may be considered a treat dispensing pet toy comprising: first and second end pieces interconnected by an axle; a treat dispensing body having an interior chamber, said body disposed between said first and second end pieces; said treat dispensing body and said first and second end pieces being aligned along a longitudinal axis; a treat dispensing opening formed on said body and communicating with said interior chamber; and wherein said first and second end pieces and said treat dispensing body independently rotate to dispense treats loaded in said interior chamber.

According to another aspect of the invention, it may be considered a treat dispensing pet toy comprising: first and second hubs interconnected by an axle; a barrel having an interior chamber, said barrel disposed between said first and second hubs; said barrel and said first and second hubs being symmetrical about a longitudinal axis; a treat dispensing opening formed on said barrel and communicating with said interior chamber; and wherein said first and second hubs and said barrel independently rotate about said longitudinal axis to dispense treats loaded in said interior chamber.

Various optional features may be incorporated within the invention as summarized in these first and second aspects.

According to another aspect of the invention, more particularly, the invention may be considered a treat dispensing pet toy comprising: a hub assembly having first and second hubs, and an axle interconnecting the hubs; a barrel having an interior chamber, the axle extending through the interior chamber; the first hub located at a first end of the barrel and the second hub located at a second opposite end of the barrel; a treat dispensing opening formed on the barrel and communicating with the interior chamber; and when the pet toy is contacted with sufficient force, the hub assembly and barrel independently rotate thereby establishing a rotational differential.

Optional characteristics of this third aspect of the invention may include: wherein the barrel has an end wall and a sleeve secured to the end wall, the axle extending through the sleeve within the interior chamber; the barrel has a removable barrel cover mounted over an access aperture formed on the barrel, and wherein the treat dispensing opening is formed on the barrel cover; the first and second hubs are circular shaped and extend substantially perpendicular to a surface to which the pet toy rests upon during use; the barrel is substantially cylindrical in shape having a longitudinal axis that extends substantially parallel to a surface to which the pet toy rests upon during use; and the barrel is substantially cylindrical in shape having a longitudinal axis that extends substantially parallel to a surface to which the pet toy rests upon during use, the barrel having first and second ends closed by the first and second hubs, respectively.

According to another aspect of the invention, it may be considered a method of dispensing treats from a pet toy comprising: providing a pet toy having a hub assembly with first and second hubs and an axle interconnecting the hubs, a barrel having an interior chamber, the axle extending through the interior chamber, and a treat dispensing opening formed on the barrel and communicating with the interior chamber; contacting the pet toy causing the pet toy to roll wherein the hub assembly rotates at first rotational speed and the barrel assembly independently rotates at a second different speed; and dispensing treats as the pet toy rotates by treats loaded in a chamber of the pet toy falling through the opening in the barrel.

Other optional characteristics of this fourth aspect of the invention may include wherein: the barrel is contacted during the contacting step to impart a spin force on the barrel to increase its rotational speed.

According to another aspect of the invention, it may be considered the treat dispensing pet toy in combination with treats loaded therein.

Additional advantages and characteristics of the invention will become more apparent from a review of the following detailed description taken in conjunction with the drawings.

BRIEF DESCRIPTION OF THE INVENTION

DETAILED DESCRIPTION OF THE INVENTION

Figure 1:
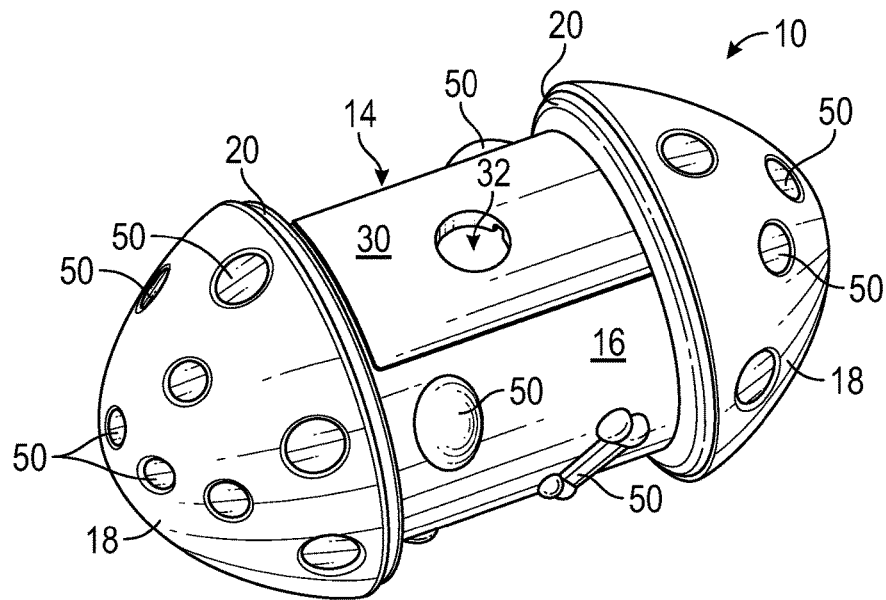
FIG. 1 is a perspective view of the treat dispensing pet toy of the invention.
Figure 2:
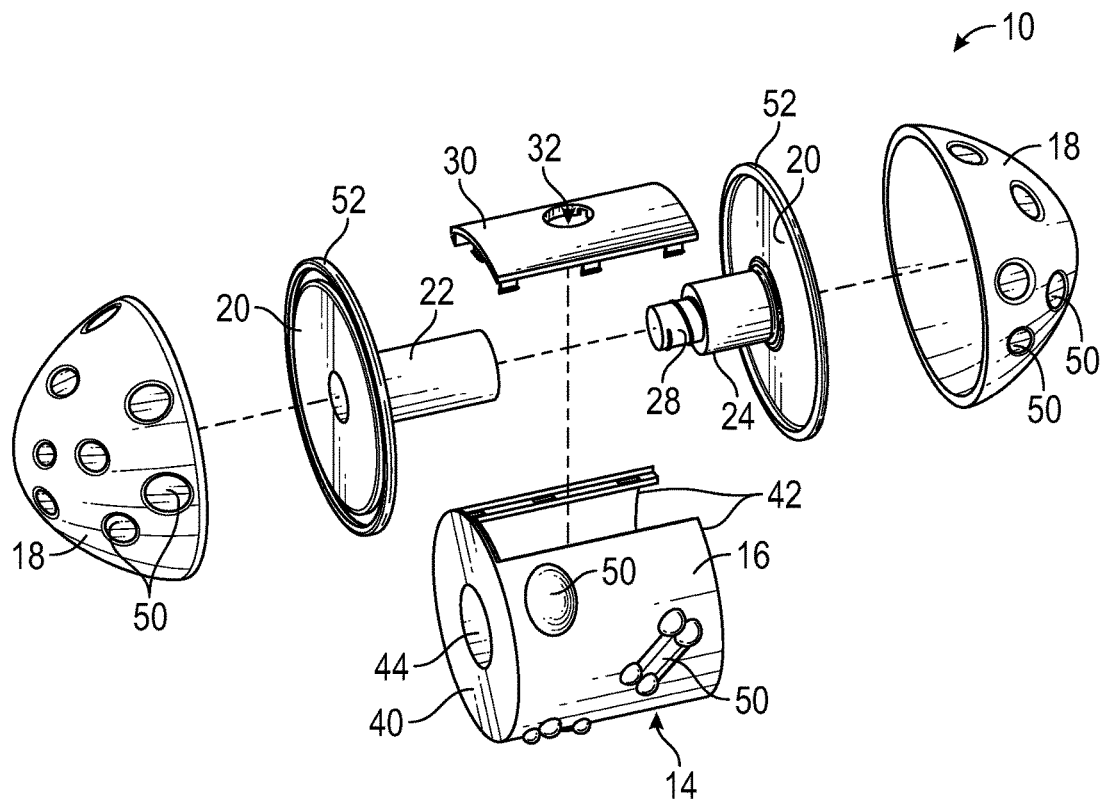
FIG. 2 is an exploded perspective view.
Figure 3:
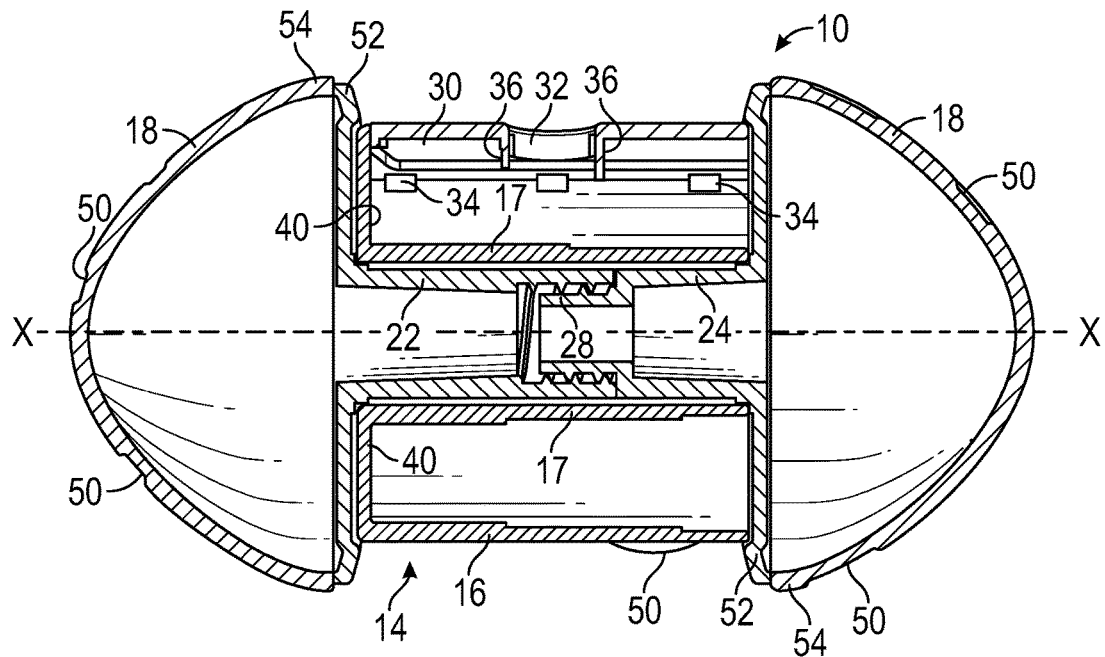
FIG. 3 is a cross-sectional view.

FIGS. 1-3 illustrate a preferred embodiment of the pet toy 10. The pet toy in its simplest form includes two interoperable or engaging components, namely, a barrel or treat dispensing body 14 and a pair of hubs or end pieces 20 interconnected by axle parts 22 and 24. A hub assembly may be defined as the pair of hubs 20 and the axle parts 22 and 24. One of the axle parts 24 has a threaded extension 28 that is inserted within the open end of the other axle part 22 having matching internal threads. The barrel 14 has a cylindrical shaped body 16, a first closed end 40, and an internal sleeve 17 that projects inward within the open space or chamber inside the barrel 14. Axle part 22 is inserted through the opening 44 that communicates with the interior of the sleeve 17.

An aperture is formed on the body 16 of the barrel 14. The aperture is covered by a removable cover 30. The cover 30 has a treat dispensing opening 32. One or more treat dispensing openings may also be formed on the body 16 if it is desired to dispense treats at a higher rate.

The hubs 20 are circular shaped with circumferential or peripheral edges 52 that allow the toy to be rolled along a surface to which the toy is placed. Optionally, end caps 18 may be attached to the hubs 24 for ornamental purposes or to add additional size and weight to the toy. The end caps shown in this embodiment have an oval or semi-spherical shape with a plurality of irregular surface features 50. The surface features may further add ornamental contributions as well as functional contributions in providing enhanced gripping for an animal contacting the toy. The specific examples of ornamental features shown are a plurality of circular shaped recesses randomly spaced around the end caps 18.

The barrel 14 is also shown with a plurality of irregular features 50 that are raised above the exterior surface of the body 16. Specifically, the raised features include a random group of circular shaped protrusions as well as boned shaped protrusions. These protrusions assist an animal in gripping the barrel 14 so that the barrel may be rotated or spun about the axle.

The cross section of FIG. 3 shows the assembled pet toy in which the toy has a center or longitudinal axis X-X. The peripheral edges 52 of the hubs 20 abut the peripheral edges 54 of the end caps 18. The peripheral edges 54 are shown as extending slightly beyond the peripheral edges 52 however the peripheral edges 54 may define a circumferential edge of the end caps 18 that may also be smaller than the circumferential edge of the hubs 20.

The hub assembly and barrel may be constructed from a thermoplastic material that is stiffer than the end caps. The end caps in this regard may be more flexible and may alternatively be elastomeric such that the pet toy may bounce if the pet toy is dropped on the end caps.

Figure 4:
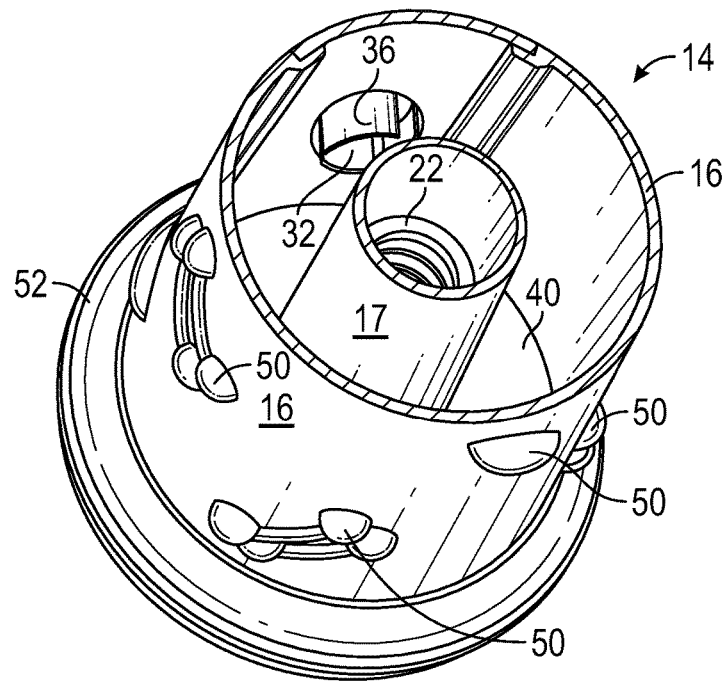
FIG. 4 is an enlarged perspective view of the pet toy showing one hub removed.

FIG. 4 shows additional detail of the open end of the barrel 14 and showing the internal sleeve 17 that extends substantially parallel with the body 16 and is substantially centered on the end wall 40. This figure also highlights the protruding nature of the features 50 on the barrel 14.

Figure 5:
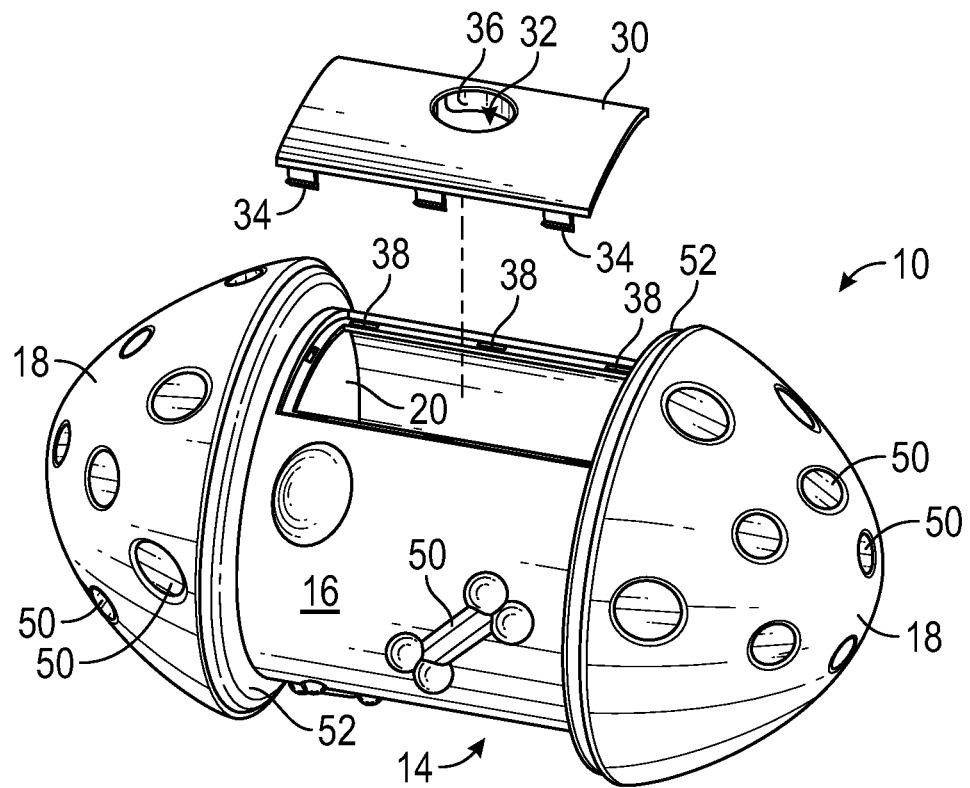
FIG. 5 is a partially exploded perspective view showing the barrel cover removed.
Figure 6:
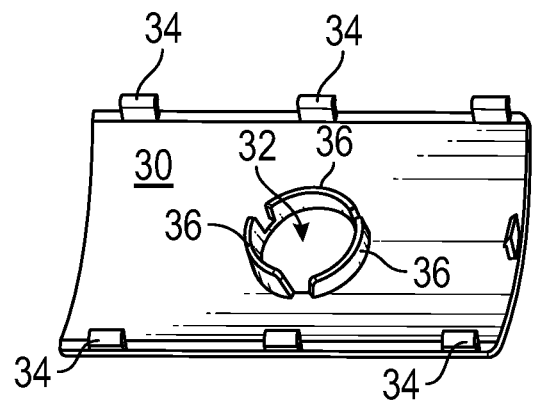
FIG. 6 is an enlarged perspective view of the barrel cover showing the interior surface thereof.

FIGS. 5 and 6 show the removable cover 30 with a plurality of tabs 34 that align with slots 38 on the barrel body 16 enabling the removable cover to be connected as by a snap-fit connection. FIG. 6 shows the treat dispensing opening 32 with a plurality of extensions 36 that protrude into the chamber of the barrel. The extensions 36 help to prevent an animal's paw from being wedged in the opening 32 by providing surface area along the extensions 36 that are oriented in the same direction as a paw that may be placed through the opening 32. The extensions 36 function as a protective sleeve to keep the animal's paw restricted within the sleeve.

Figure 7:
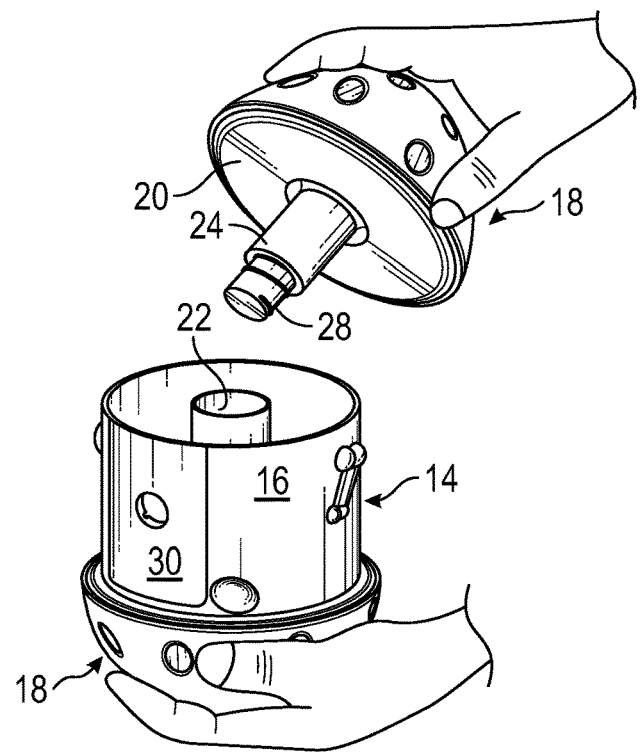
FIG. 7 is a perspective view showing one end cap unscrewed thereby exposing the interior chamber of the barrel.
Figure 8:
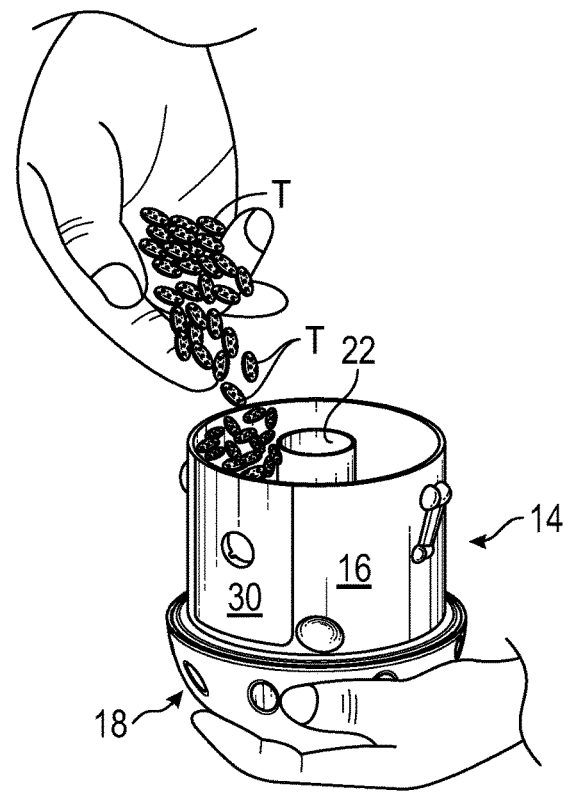
FIG. 8 is a perspective view showing treats being loaded in the barrel.

FIG. 7 is a perspective view showing one end cap 18 unscrewed thereby exposing the interior chamber of the barrel 14. FIG. 8 is a perspective view showing treats T being loaded in the barrel. As shown, exposing the barrel in this way makes it very easy to load treats. The barrel 18 may simply be unscrewed to load and then screwed on for use. The removable end cap also makes cleaning simple for the interior chamber of the barrel.

Figure 9:
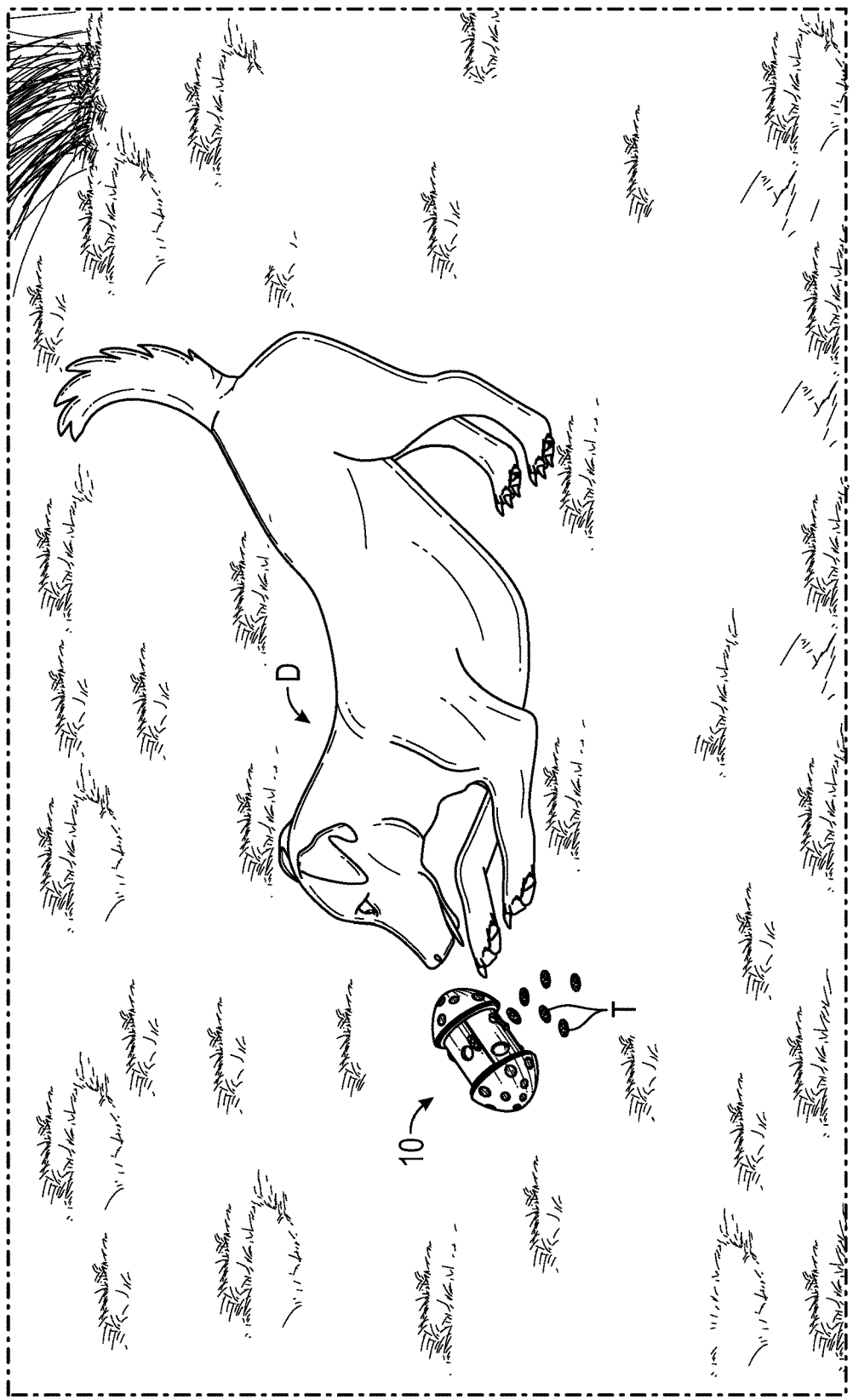
FIG. 9 is a perspective view of the pet toy with treats being dispensed for play with an animal.

FIG. 9 shows the pet toy with treats T being dispensed by the interaction between a dog D and the pet toy. During use of the pet toy, the animal will contact the end caps, barrel, or both. Sufficient force applied by the animal will cause the pet toy to be displaced and in some circumstances, the pet toy will roll along the surface in contact with the toy. The rolling action of the pet toy has two movement components; the hub assembly and end caps will rotate at a first rotational speed while the barrel will rotate at a second rotational speed thus defining the rotational differential. If the animal makes contact with the barrel to effectively spin the barrel about the axle, the barrel may have a first relatively higher rotational speed and treats will be expelled through the treat dispensing opening at a higher rate. If the animal makes contact with the toy but does not spin the barrel, the barrel will have a second relatively slower rotational speed and treats will be expelled through the treat dispensing opening at a lower rate. Because of the rotational differential, treats are dispensed at a less predictable and therefore more random manner which may further induce play with the toy. If the animal is able to learn that spinning of the barrel produces a higher rate of dispense, this may further add to the attractiveness of the pet toy.

The invention is described in detail with respect to preferred embodiments; however, the invention is not specifically limited to the preferred embodiments. The invention should be considered as including all embodiments falling within the scope of the claims appended hereto.

The invention claimed is:

1. A treat dispensing pet toy comprising:
   a hub assembly having first and second hubs and an axle interconnecting the hubs;
   a barrel having an interior chamber, said axle extending through said interior chamber;
   said first hub located at a first end of said barrel and said second hub located at a second opposite end of said barrel;
   a treat dispensing opening formed on said barrel and communicating with said interior chamber; and
   wherein when the pet toy is contacted with sufficient force, the hub assembly and barrel independently rotate thereby establishing a rotational differential.

2. The treat dispensing pet toy, as claimed in claim 1, wherein:
   said barrel has an end wall and a sleeve secured to said end wall, said axle extending through said sleeve within said interior chamber.

3. The treat dispensing pet toy, as claimed in claim 1, wherein:
   said barrel has a removable barrel cover mounted over an access aperture formed on said barrel, and wherein said treat dispensing opening is formed on said barrel cover.

4. The treat dispensing pet toy, as claimed in claim 1, wherein:
   said first and second hubs are circular shaped and extend substantially perpendicular to a surface to which the pet toy rests upon during use.

5. The treat dispensing pet toy, as claimed in claim 4, wherein
said barrel is substantially cylindrical in shape having a longitudinal axis that extends substantially parallel to a surface to which the pet toy rests upon during use, said barrel having first and second ends closed by said first and second hubs, respectively.

6. The treat dispensing pet toy, as claimed in claim 1, wherein:
said barrel is substantially cylindrical in shape having a longitudinal axis that extends substantially parallel to a surface to which the pet toy rests upon during use.

7. The treat dispensing pet toy, as claimed in claim 1, further including:
a plurality of pet treats loaded in said chamber of said barrel.

8. The treat dispensing pet toy, as claimed in claim 1, further including:
first and second end caps secured to said first and second hubs, respectively.

9. A method of dispensing treats from a pet toy comprising:
providing a pet toy having a hub assembly with first and second hubs and an axle interconnecting the hubs, a barrel having an interior chamber, said axle extending through said interior chamber, and a treat dispensing opening formed on said barrel and communicating with said interior chamber;
contacting the pet toy causing the pet toy to roll wherein the hub assembly rotates at first rotational speed and the barrel assembly independently rotates at a second rotational speed; and
dispensing treats as the pet toy rotates by treats loaded in a chamber of the pet toy falling through the opening in the barrel.

10. The method, as claimed in claim 9, wherein:
the first rotational speed is different than the second rotational speed.

11. The method, as claimed in claim 9, wherein:
the barrel is contacted during the contacting step to impart a spin force on the barrel to increase its rotational speed.

12. A treat dispensing pet toy comprising:
first and second hubs interconnected by an axle;
a barrel having an interior chamber, said barrel disposed between said first and second hubs;
said barrel and said first and second hubs being symmetrical about a longitudinal axis;
a treat dispensing opening formed on said barrel and communicating with said interior chamber; and
wherein said first and second hubs and said barrel independently rotate about said longitudinal axis to dispense treats loaded in said interior chamber.

13. The treat dispensing pet toy, as claimed in claim 12, wherein:
said barrel further includes an end wall and a sleeve secured to said end wall, said axle extending through said sleeve within said interior chamber.

14. The treat dispensing pet toy, as claimed in claim 12, wherein:
said barrel is substantially cylindrical in shape and aligned along said longitudinal axis.

15. The treat dispensing pet toy, as claimed in claim 12, wherein:
said barrel extends substantially parallel to a surface to which the pet toy rests upon during use.

16. The treat dispensing pet toy, as claimed in claim 12, wherein:
said barrel has first and second ends closed by said first and second hubs, respectively.

17. A treat dispensing pet toy comprising:
first and second end pieces interconnected by an axle;
a treat dispensing body having an interior chamber, said body disposed between said first and second end pieces;
said treat dispensing body and said first and second end pieces being aligned along a longitudinal axis;
a treat dispensing opening formed on said body and communicating with said interior chamber; and
wherein said first and second end pieces and said treat dispensing body independently rotate to dispense treats loaded in said interior chamber.

* * * * *